Aug. 26, 1952     R. E. STOCKMAN     2,608,200
OXYGEN DEMAND REGULATOR, INCLUDING ALTITUDE COMPENSATOR
Filed May 17, 1951
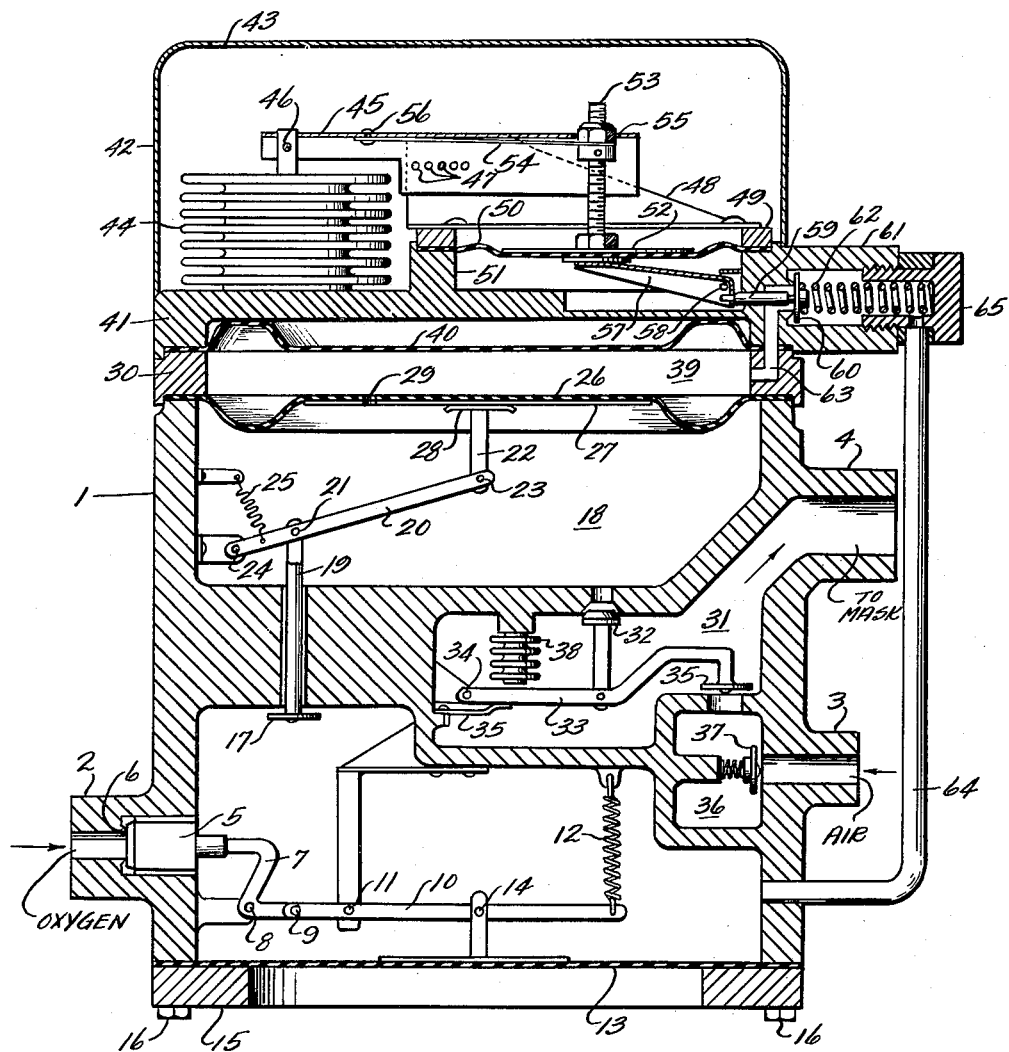
INVENTOR.
RICHARD E. STOCKMAN
BY Wade Loomis
ATTORNEY
Charles L. Burgoyne
AGENT Patented Aug. 26, 1952

2,608,200

UNITED STATES PATENT OFFICE 2,608,200

OXYGEN DEMAND REGULATOR, INCLUDING ALTITUDE COMPENSATOR

Richard E. Stockman, South Euclid, Ohio, assignor to the United States of America as represented by the Secretary of the Air Force Application May 17, 1951, Serial No. 226,858

4 Claims. (Cl. 137—64)

1

The present invention relates to an oxygen demand regulator including an altitude compensating means to increase the rate of oxygen flow as altitude increases.

The primary object of the invention is to provide an oxygen demand regulator particularly for use by aviators for supplying oxygen to a face mask according to the demand therefor, and to further provide in the regulator an automatically operable means to increase the rate of flow of oxygen as the altitude increases.

A further object of the invention is to provide an oxygen demand regulator particularly for use by aviators for supplying oxygen to a face mask according to the demand therefor and including an oxygen flow regulating valve for admitting oxygen under pressure to a first chamber connected to the face mask and closed on one side by a flexible diaphragm providing through suitable connections means to actuate the regulating valve and further including a second chamber at the side of the diaphragm remote from the first chamber and a means for admitting oxygen under pressure to the second chamber for applying fluid pressure proportional to altitude to the diaphragm whereby the effect of the diaphragm on the regulating valve will be accentuated in order to increase the rate of oxygen flow through the valve and the rate of oxygen flow to the face mask.

Another object of the invention is to provide an oxygen demand regulator for aviators characterized by automatic regulation of the rate of oxygen flow in accordance with the altitude, whereby the rate of flow increases in proportion to the increase in altitude.

The above and other objects of the invention will become apparent upon reading the following detailed description in conjunction with the single view, showing the regulator in central vertical cross section.

The main body 1 of the regulator includes connections 2, 3 and 4 for oxygen, air and a face mask respectively. The air connection is used in order to make possible the well-known air dilution principle which conserves oxygen at moderate altitudes where air is drawn in and mixed with oxygen before flowing to the face mask by way of the connection 4. At extreme altitudes the air dilution valve is closed by a pressure responsive bellows, so that only oxygen reaches the face mask. The details of the air dilution valve will be fully described below, although it is not inventive at this stage of development (see for instance Patent No. 2,384,669 granted to G. C. Fields on September 11, 1945).

2

Oxygen under high pressure is connected at 2 to a reducing valve 5 slidably mounted and including a flat outer end engageable with a valve seat 6 adjacent to the oxygen inlet 2. The oxygen pressure will effectively open the valve when the position of a control bellcrank 7 permits opening. The bellcrank is mounted on a fixed pivot 8 and is further pivoted at 9 to a lever 10 mounted to turn about a fixed pivot 11. A tension spring 12 tends at all times to swing lever 10 in a direction to permit opening of valve 5. The force of spring 12 is resisted by the effect of a large diaphragm 13 connected to lever 10 at 14, it being understood that pressure developed in the reducing valve chamber acts over the inside surface of the diaphragm. The latter is secured to the body 1 at its periphery by means of a clamping ring 15 secured in place by bolts 16 extending into the body wall. As oxygen is used from the reducing valve chamber by flow past the regulating valve 17, the pressure in the chamber tends to be reduced with the result that the diaphragm does not oppose the spring 12 with sufficient force to hold the inlet valve 5 closed. Then the high pressure oxygen is able to flow in regulated amount into the chamber to again build up the pressure therein to a normal level, which is only a small fraction of the oxygen pressure in the connection 2. The pressure in the chamber being distributed over a large diaphragm, the total pressure normally opposing the force of spring 12 may be rather considerable. For instance if the average pressure in the reducing valve chamber is 30 pounds per square inch and the effective area of the diaphragm is 4 square inches, then the diaphragm will exert a force on the lever 10 of about 120 pounds.

Oxygen is free to flow from the reducing valve chamber by way of regulating valve 17 into the upper chamber 18 when the valve is opened periodically. Actuation of the regulator valve is accomplished by means of a stem 19 on the valve, a lever 20 pivoted to the stem at 21 and a diaphragm actuated strut 22 pivoted to the lever at 23. The lever 20 is mounted on a fixed pivot 24 and is urged toward the diaphragm by a very light spring 25, which also tends to keep the regulator valve 17 closed. The valve control diaphragm 26, which is very light and flexible, carries a pressure distribution plate 27 on its lower face against which bears a pressure plate 28 on the upper end of strut 22. At 29 the diaphragm and adjacent plate are pierced to provide a bleed passage of very small caliber. The marginal edges of the control diaphragm 26 are clamped between the walls of body 1 and an upper clamping ring 30 by suitable fastening elements (not shown).

The air dilution chamber 31 just below the chamber 18 to the right communicates therewith by way of a poppet valve 32 movably mounted on a lever 33. The lever is free to turn about a fixed pivot 34 and is urged upwardly by a light spring 35. An air dilution valve 35 on the free end of the lever admits air to chamber 31 from an air admission chamber 36 open to the atmosphere by way of the connection 3 and a simple check valve 37. As will be seen the air dilution chamber 31 leads directly to the mask connection 4. A small aneroid bellows 38 in chamber 31 is adapted upon expansion to move the lever 33 downwardly and effectively close off the air dilution valve 35 in a positive manner.

An altitude compensation chamber 39 above diaphragm 26 is closed on its upper side by another diaphragm 40 retained between the clamping ring 30 and a flanged closure plate or cap 41. A cover member 42 secured over the cap 41 is open to the atmosphere at 43 and serves to enclose the altitude compensating mechanism. The outer side of cap 41 carries an aneroid bellows 44 actuating a lever 45 through a pivot connection 46 at one end of the lever. At any one of several alternative pivot points 47 the lever is mounted to turn on a transverse pivot secured to a bearing plate 48 preferably used in pairs at opposite sides of the sheet metal lever 45. The bracket or plate 48 is mounted on a ring 49 which also serves to clamp a small diaphragm 50 to a circular flange 51 integral with the cap 41. Bearing on the upper side of the diaphragm 50 is a pressure plate 52 which carries a screw member 53 adjustably secured to a small leaf spring 54 and projecting through an aperture 55 in the upper surface of lever 45. The other end of the leaf spring is riveted to the lower surface portion of the lever 45 at 56. The under side of the diaphragm 50 is engaged by a small bellcrank 57 mounted on a fixed pivot 58 and also engaging a push rod 59 fixed to a poppet valve 60 in an oxygen chamber 61 at one side of the cap member 41. The valve 60 is normally closed by a compression spring 62 in the chamber 61. Chamber 61 is connected to the altitude compensation chamber 39 by way of a passage 63 when the valve 60 is open. The chamber 61 is always in communication with the reducing valve chamber by way of a tube 64 external of the regulator body or housing. The chamber 61 is closed at its outer end by a screw cap 65 as shown.

Operation

Considering the operation of the regulator at various altitudes, the mode of operation will first be considered at sea level conditions. The reducing valve in the lowermost chamber will function to admit oxygen through inlet 2 until the pressure on the inside of diaphragm 13 acts through levers 10 and 7 to close the valve 5 against valve seat 6. The pressure on the outer end of valve 5 is much higher than that in the reducing valve chamber but is spread over a much smaller area. Thus the lower pressure in the chamber acting over the large area of diaphragm 13 can overbalance the pressure on the end of the valve at inlet 2 and hold the valve in closed position, until oxygen is used from the chamber by opening of the flow regulating valve 17. Then the pressure in the chamber will drop and the inlet valve 5 will open and admit more oxygen to the chamber. The ratio of the pressure at inlet 2 and the pressure on the diaphragm 13 is approximately equal to the ratio of the diaphragm area and the enclosed area of valve seat 6.

At sea level most of the oxygen requirements are met by air drawn in at inlet 3 by suction derived from inhalation of the subject. The lightly loaded check valve 37 is pulled off its seat and air flows past valve 35 into chamber 31 and thereby reaches the mask through outlet 4. If the subject should inhale deeply and the pressure in chamber 31 should fall faster than the inflow of air could overcome, the valve 32 will open against the light pressure of spring 35. Now the reduced pressure in chamber 18 will draw the control diaphragm 26 downwardly to cause the valve 17 to open and admit oxygen to chamber 18. At least some of this oxygen will then flow through valve 32 to the chamber 31 and into the mask. However, most of the oxygen requirements at ground level will be supplied by the air dilution system, through valves 37 and 35.

Now considering the operation at some moderate elevation, say about 14,000 feet, the aneroid bellows 38 in chamber 31 will have expanded to nearly close the valve 35 if not altogether closing it. Also the valve 32 will now be held open at all times. Thus inhalation will reduce the pressure in chamber 18 and the diaphragm 26 will bulge downwardly very definitely to cause pronounced opening of the flow regulating valve 17. The oxygen from the reducing valve chamber will flow into chamber 18 and thence past valve 32 to the outlet 4 and to the face mask. Little or no air will be drawn through the diluter valve 35. The reduced barometric pressure will also cause expansion of bellows 44 and rocking of the lever 45 in a clockwise direction about a selected pivot 47. This will further cause movement of lever 57, to push the valve 60 off its seat and admit oxygen by way of inlet 63 to the chamber 39. The pressure developed in this chamber will cause downward bulging of diaphragm 26 to give a more pronounced opening action to supply valve 17 and thus increase the rate of flow of oxygen to the subject. All this action is accomplished automatically and requires no attention on the part of the aircraft personnel. On exhalation by the subject the pressure in chamber 18 increases and the diaphragm 26 is pushed upwardly. This causes the valve 17 to close by action of tension spring 25. It is noted that selection of a fulcrum point for lever 45 will determine the amount of action afforded by aneroid bellows 44, since the closer the pivot 47 is placed to the point 46 the more effect any increment of bellows expansion will have on the oxygen valve 60 which admits the gas to the altitude compensating chamber 39.

At extremely high altitudes the operation will be essentially the same as that explained for the moderate altitude. The air dilution valve 35 will be held tightly closed and the oxygen valve 32 will be wide open, due to expansion of aneroid bellows 38. The aneroid bellows 44 will expand to admit a maximum flow of oxygen into the compensating chamber 39 and thus cause the valve 17 to be held partly open at all times. On inhalation the valve 17 will open wide and on exhalation the valve will tend to close. The bleed passage 29 in the control diaphragm 26 permits oxygen to flow from the chamber 39 at a steady rate but into the chamber 18 where it can be used by the subject. Pressure will build up in the chamber 39 only when the oxygen flows in faster than it can escape by bleed passage 29. This passage provides a kind of safety valve to prevent high pressure from developing in chamber 39, which might rupture the diaphragm 26. The effective pressure in chamber 39 is determined by the relative rates of flow through valve 60 and through the bleed passage 29.

In the present description only one particular type of oxygen regulating mechanism is referred to but it should be understood that the altitude compensating mechanism might be used with various types of oxygen demand regulators, particularly in any regulator having a flexible valve controlling diaphragm corresponding in purpose and function to the diaphragm 26 of the illustrated structure.

The embodiments of the invention herein shown and described are to be regarded as illustrative only and it is to be understood that the invention is susceptible of variations, modifications and changes within the scope of the appended claims.

I claim:

1. An oxygen demand regulator comprising, a housing having a first chamber therein adapted for connection to a face mask, a flexible diaphragm closing one side of said first chamber, a flow regulating valve in one wall of said first chamber and adapted to admit oxygen under pressure thereto, lever operating means connected between said diaphragm and said flow regulating valve operable to open said valve as the pressure in said first chamber is reduced upon inhalation and to close said valve as the pressure in said first chamber is increased upon exhalation, means providing a second chamber separated from said first chamber by said diaphragm, and means for admitting oxygen under pressure to said second chamber at altitudes substantially greater than sea level in order to increase the valve opening action of said diaphragm and thus increase the rate of oxygen flow into said first chamber.

2. An oxygen demand regulator comprising, a housing having a first chamber therein adapted for connection to a face mask, a flexible diaphragm closing one side of said first chamber, a flow regulating valve in one wall of said first chamber and adapted to admit oxygen under pressure thereto, lever operating means connected between said diaphragm and said flow regulating valve operable to open said flow regulating valve as the pressure in said first chamber is reduced upon inhalation and to close said valve as the pressure in said first chamber is increased upon exhalation, means providing a second chamber separated from said first chamber by said diaphragm, a second valve in one wall of said second chamber adapted to admit oxygen under pressure thereto, an aneroid bellows exposed to atmospheric pressure, lever means connecting said bellows and said second valve for causing said second valve to open in proportion to elevation above sea level, whereby to increase the action of said diaphragm in opening said flow regulating valve and thus increase the rate of flow of oxygen into said first chamber upon increase in altitude.

3. An oxygen demand regulator comprising a housing having a first chamber therein adapted for connection to a face mask, a flexible diaphragm closing one side of said first chamber and having a small bleed passage therethrough, a flow regulating valve in one wall of said first chamber and adapted to admit oxygen under pressure thereto, means connected between said diaphragm and said flow regulating valve operable to open said flow regulating valve as the pressure in said first chamber is reduced upon inhalation and to close said valve as the pressure in said first chamber is increased upon exhalation, means providing a second chamber separated from said first chamber by said diaphragm, a second valve in one wall of said second chamber adapted to admit oxygen under pressure thereto, means responsive to reduction of atmospheric pressure to open said second valve an amount proportional to altitude, whereby to increase the action of said diaphragm in opening said flow regulating valve and thus increase the rate of flow of oxygen into said first chamber upon increase in altitude.

4. An oxygen demand regulator comprising, a housing having a first chamber therein adapted for connection to a face mask, a flexible diaphragm closing one side of said first chamber and having a small bleed passage therethrough, a flow regulating valve in one wall of said first chamber and adapted to admit oxygen under pressure thereto, means responsive to bulging of said diaphragm into said first chamber from a neutral position to open said flow regulating valve and responsive to bulging of said diaphragm away from said chamber and from said neutral position to close said flow regulating valve, means providing a second chamber separated from said first chamber by said diaphragm, a second valve in one wall of said second chamber adapted to admit oxygen under pressure thereto, means responsive to reduction of atmospheric pressure to open said second valve an amount proportional to altitude, whereby to increase the action of said diaphragm in opening said flow regulating valve and thus increase the rate of flow of oxygen into said first chamber upon increase in altitude.

RICHARD E. STOCKMAN.

REFERENCES CITED

The following references are of record in the file of this patent:

UNITED STATES PATENTS

| Number | Name | Date |
|---|---|---|
| 2,384,669 | Fields | Sept. 11, 1945 |